United States Patent
Humhauser

(10) Patent No.: US 9,605,549 B2
(45) Date of Patent: Mar. 28, 2017

(54) STATIONARY BLADE RING, ASSEMBLY METHOD AND TURBOMACHINE

(71) Applicant: MTU Aero Engines AG, Munich (DE)

(72) Inventor: Werner Humhauser, Moosburg (DE)

(73) Assignee: MTU Aero Engines AG, Munich (DE)

( * ) Notice: Subject to any disclaimer, the term of this patent is extended or adjusted under 35 U.S.C. 154(b) by 590 days.

(21) Appl. No.: 13/957,716

(22) Filed: Aug. 2, 2013

(65) Prior Publication Data

US 2014/0044526 A1 Feb. 13, 2014

(30) Foreign Application Priority Data

Aug. 7, 2012 (EP) .................................... 12179453

(51) Int. Cl.
*F01D 11/00* (2006.01)
*F01D 17/16* (2006.01)

(52) U.S. Cl.
CPC .......... *F01D 11/003* (2013.01); *F01D 17/162* (2013.01); *F05D 2230/60* (2013.01); *F05D 2250/411* (2013.01); *Y02T 50/671* (2013.01); *Y10T 29/49336* (2015.01)

(58) Field of Classification Search
CPC .. F01D 17/162; F01D 11/003; F05D 2230/60; F05D 2250/411; Y02T 50/671; Y10T 29/49336
See application file for complete search history.

(56) References Cited

U.S. PATENT DOCUMENTS

| | | | |
|---|---|---|---|
| 4,395,195 A | 7/1983 | De Cosmo et al. | |
| 4,604,030 A * | 8/1986 | Naudet | F01D 11/001 |
| | | | 415/126 |
| 4,706,354 A | 11/1987 | Naudet et al. | |
| 5,062,767 A * | 11/1991 | Worley | F01D 9/042 |
| | | | 415/190 |
| 6,129,512 A | 10/2000 | Agram et al. | |
| 7,713,022 B2 * | 5/2010 | Major et al. | F01D 17/162 |
| | | | 29/889.22 |
| 8,376,692 B2 | 2/2013 | Stiehler | |
| 2002/0154991 A1 | 10/2002 | Bowen | |
| 2004/0188947 A1 * | 9/2004 | Paprotna | F01D 11/001 |
| | | | 277/413 |
| 2007/0059161 A1 * | 3/2007 | Bouru | F01D 17/162 |
| | | | 415/160 |
| 2009/0208338 A1 | 8/2009 | Major et al. | |

FOREIGN PATENT DOCUMENTS

| | | |
|---|---|---|
| DE | 10 2006 024 085 | 11/2007 |
| DE | 10 2007 015 6669 | 10/2008 |
| DE | 102008032661 | 1/2010 |
| EP | 1705341 | 9/2006 |
| WO | WO 2008/119325 | 10/2008 |

* cited by examiner

*Primary Examiner* — Thomas Denion
*Assistant Examiner* — Brandon Lee
(74) *Attorney, Agent, or Firm* — Davidson, Davidson & Kappel, LLC

(57) ABSTRACT

Disclosed is an adjustable stationary blade ring of a turbomachine, whose stationary blades are each supported in a bearing body onto which an inner ring, which is divided into two half rings and acts as a seal carrier, is pushed without deformation, viewed in the circumferential direction, as well as a method for assembling a stationary blade ring of this type and a turbomachine having a stationary blade ring of this type.

10 Claims, 4 Drawing Sheets

STATIONARY BLADE RING, ASSEMBLY METHOD AND TURBOMACHINE

This claims the benefit of European Patent Application EP 12179453.1, filed Aug. 7, 2012 and hereby incorporated by reference herein.

The present invention relates to a stationary blade ring, a method for assembling a stationary blade ring and a turbomachine.

BACKGROUND

For the purpose of setting optimum operating conditions, turbomachines such as aircraft engines routinely have at least one compressor-side, adjustable stationary blade row (that does not rotate around the engine machine axis) including a plurality of stationary blades which are pivotable around their main axis or blade axis. Together with an inner ring which encompasses a rotor section, the stationary blade row forms a stationary blade ring. The inner ring is used for the inner stabilization and support of the stationary blades and usually has a plurality of radial bearing holes, into which the bearing bushes are inserted for accommodating a blade-side bearing journal.

As shown, for example, in DE 10 2007 015 669 A1, and related WO 2008/119325, hereby incorporated by reference herein, an inner ring may be divided into two half rings on a horizontal housing parting plane of the turbomachine, these half rings, in turn, being divided along an axial parting plane into a front half ring segment and a rear half ring segment. The half ring segments are assembled in the axial direction around the bearing journals of the stationary blades and mounted with the aid of axial connecting elements, such as pins or screws, which are inserted between the adjacent bearing journals. A seal carrier having run-in coatings on its inner circumferential side is pushed onto the half ring segments in the circumferential direction for sealing a radial clearance between the inner ring and a diametrically opposed rotor section. However, the positioning of the axial connecting elements requires a minimum clearance between the bearing bushes, which has a limiting effect on a minimum engine size.

Composing the inner ring from two half rings which are undivided in the axial direction is alternatively proposed in DE 10 2006 024 085 A1 and related U.S. Pat. No. 8,376,692, hereby incorporated by reference herein. The half rings are elastically deformable in such a way that they may roll over the bearing journals of the stationary blades mounted in housing halves. The half rings are pretensioned to a constant tensioning radius, positioned in the area of the bearing journals and then relaxed. However, a separate seal carrier for sealing a radial clearance between the inner ring and a diametrically opposed rotor section is also required in this variant.

Providing the ring segments of an inner ring, which is undivided in the axial direction, with a circumferential angle which is much smaller than 180°, is proposed in U.S. Pat. No. 4,395,195 A. This permits assembly without elastic deformation of the ring segments. The ring segments are each pushed onto a bearing body in the circumferential direction and coupled on their abutment surfaces in a form-locked manner. The bearing bodies are used to support at least two stationary blades and have the same circumferential angle as the ring segments. However, vibration problems arise due to the large number of ring segments. Furthermore, potential leakage paths are formed in the area of the ring segment abutment surfaces. To seal a radial clearance between the inner ring and a diametrically opposed rotor section, the ring segments are provided with run-in coatings on the inner circumferential side.

SUMMARY OF THE INVENTION

It is an object of the present invention to provide a stationary blade ring for a turbomachine which eliminates the aforementioned disadvantages and permits an optimum adjustment of a radial clearance to a rotor section encompassed by the stationary blade ring. The object of the present invention is furthermore to provide an easy method for assembling a stationary blade ring and a turbomachine which at least has a high compressor efficiency.

The present invention provides a stationary blade ring for a turbomachine having a plurality of rotatable stationary blades, an inner ring for the radial inner stabilization of the stationary blades, a seal for sealing a radial clearance between an inner ring and a diametrically opposed rotor section and bearing bodies for supporting the stationary blades in the inner ring. According to the present invention, each stationary blade is supported in an individual bearing body, and the inner ring is composed of two half rings which are pushed onto the bearing bodies in the circumferential direction.

The stationary blade ring according to the present invention has a multifunctional inner ring. On the one hand, it is used to connect the bearing bodies. On the other hand, it is used to carry run-in coatings and thus serve as a sealing carrier. The fact that the inner ring, and thus the run-in coatings, is/are supported in a centered spoke-like manner above the bearing bodies results in an automatic and thus optimum radial clearance adjustment, which has a minimizing effect on leakage. Since the stationary blades are supported in the bearing bodies, and the latter are manufactured separately from the inner ring or its half rings, there is no need for a precise circumferential positioning of inner ring-side bearing holes for accommodating the bearing journals. The stationary blade ring according to the present invention does not require any further circumferential segmentation or even an axial division of the half rings, so that, on the one hand, the formation of leakage paths within the inner ring is minimized and, on the other hand, no axial screwing of the front and rear half ring segments is necessary. The stationary blade ring has a small number of parts and therefore a simplified assembly and disassembly. Due to the fact that the half rings do not need to be provided with bearing holes and also do not have any front and rear half ring segments to be secured, the complexity thereof is substantially reduced, which allows the half rings to be easily manufactured, for example, as turned parts.

The bearing bodies preferably touch each other on the side and have two diametrically opposed grooves extending in the circumferential direction. The half rings preferably each have a U-shaped profile, including two diametrically opposed projections extending in the circumferential direction, with the aid of which they engage with the grooves. Bearing bodies of this type and half rings of this type are easy to manufacture and easy to assemble. In addition, a front and rear guidance of the half rings on the bearing bodies or a front and rear connection of the adjacent bearing bodies is provided, which achieves a high stability.

The bearing bodies may each have a bush section, in which the stationary blades are each radially guided by a bearing journal with regard to their adjusting axis, and a sunken section, in which the stationary blades are accommodated by their blade plates which are radially expanded in relation to the bearing journals. Due to the fact that the blade plates are accommodated in sunken sections, an unsegmented annular chamber wall may be provided in the area of the stationary blade ring, which has a favorable effect in terms of flow on the main flow flowing through the annular chamber. At the same time, radial rim clearances between the rotating blades and the inner ring are minimized, which also has a positive effect on the main flow. A stop for the inner ring is simultaneously created by each of the radially expanded blade plates, thereby preventing the inner ring from unintentionally running into the blades as a result of different thermal expansion.

The bearing bodies may be made, for example, of plastic. Bearing bodies of this type are lower in weight and facilitate a low-friction bearing. A plastic having a low thermal conductivity and a high mechanical and chemical stress tolerance is preferably used. Examples of such plastics are Vespel® or carbon-based plastics.

Alternatively, the bearing bodies are metallic and are provided with an anti-friction layer on their inner circumference, at least in the area of their bush section. Bearing bodies of this type are highly tolerant to thermal, mechanical and chemical stresses and may be manufactured, for example, by laser sintering. The anti-friction layer permits a coefficient of friction to be precisely set regardless of the metallic base material of the bearing body.

The seal may have a plurality of plate-type sealing elements, each of which is situated on a circumferential wall of the half rings. Sealing elements of this type are, for example, run-in coatings which may have a circumferential angle of 180°. They permit a reliable running in of rotor-side sealing tips or sealing fins and thus an effective seal. The sealing elements may, of course, also have a greater circumferential segmentation. The sealing elements are preferably integrally connected to the half rings, for example soldered or welded. Alternatively, they may be connected to the half rings in a force-fitted manner, in particular dowelled or riveted.

Alternatively, the seal may have a plurality of brush elements which are detachably clamped to the half rings downstream from the stationary blades. The brush elements are characterized by a low weight and by easy removability, since, unlike the plate-type sealing elements, they are not connected to the half rings in an integral or force-fitted manner but in a form-locked manner.

The brush elements preferably each have a retaining section, with the aid of which they are inserted into a retaining groove of the half rings and are fixed in place with the aid of a clamping element inserted between a radial web of the half rings and between the radial web and the retaining section. In terms of manufacturing, a positional fixing of this type is easy to execute and robust.

In a method according to the present invention for assembling a stationary blade ring, a single bearing body is mounted on each bearing journal of the stationary blades. Half rings are then pushed onto the adjoining bearing bodies in the circumferential direction. A method of this type enables a stationary blade ring to be provided whose inner ring is composed of only two half rings, which may be assembled without deformation to form the inner ring. Due to the deformation-free assembly, the half rings may be provided with seals for sealing a radial clearance to a diametrically opposed rotor section. The inner ring may thus simultaneously act as a seal carrier, which is also centered in a spoke-like manner, due to the individual support of the stationary blades in the bearing bodies, so that an optimum radial clearance to the diametrically opposed rotor section may automatically form.

A turbomachine according to the present invention has at least one stationary blade ring according to the present invention. Due to the optimum radial orientation of the inner ring in relation to the diametrically opposed rotor section, a turbomachine of this type is characterized by a higher compressor efficiency than a turbomachine having a conventional stationary blade ring.

Preferred exemplary embodiments of the present invention are explained in greater detail below with reference to the highly simplified schematic illustrations.

DETAILED DESCRIPTION

Figure 1:
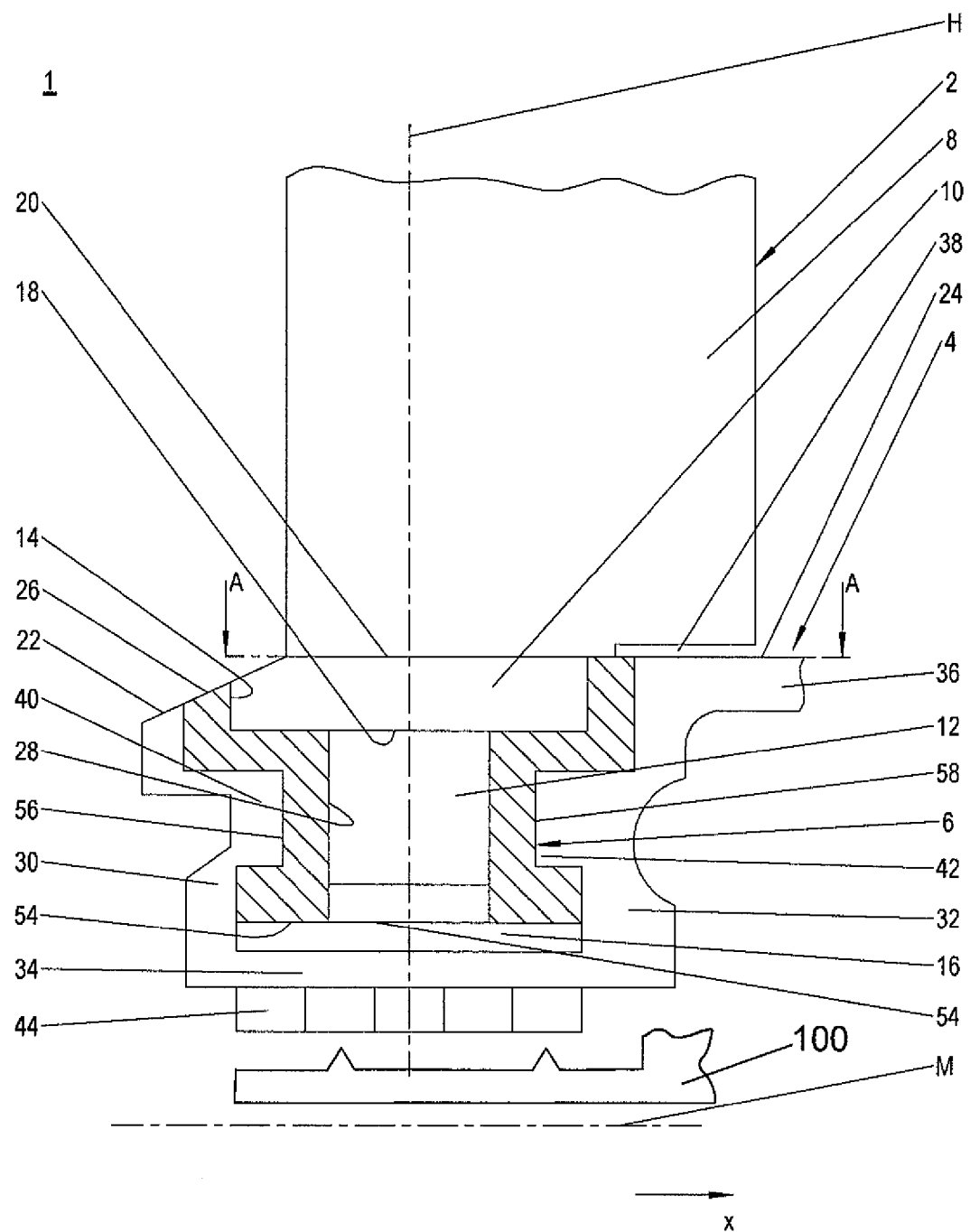
FIG. 1 shows an axial sectional view of a first exemplary embodiment of a stationary blade ring according to the present invention.

According to a cut section of an exemplary embodiment shown in FIG. 1, a stationary blade ring 1 according to the present invention of a turbomachine, such as an aircraft engine, has at least a plurality of stationary blades 2, an inner ring 4 and a plurality of bearing bodies 6. Stationary blade ring 1 is situated on the stator side in the compressor of the turbomachine and encompasses a rotor section of a rotor 100 (shown schematically), which rotates around a machine axis M extending in flow direction x of a main flow.

Figure 5:
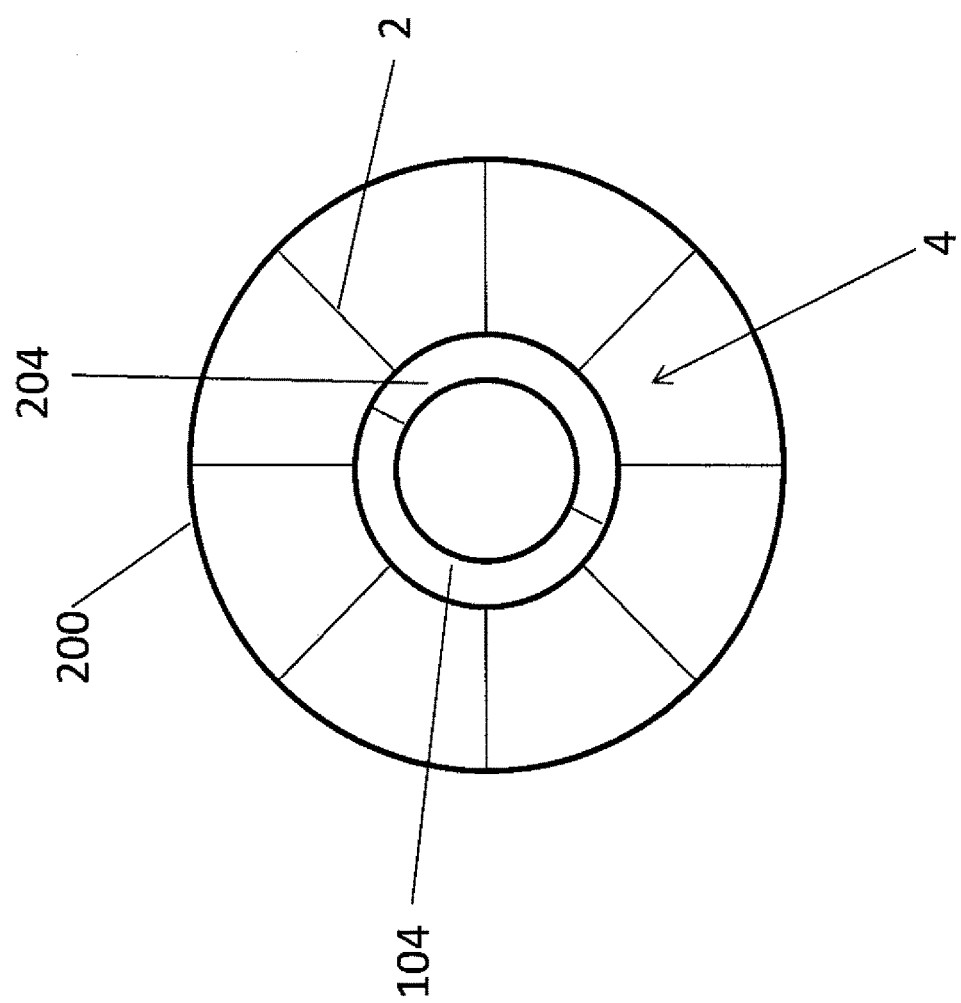
FIG. 5 shows a schematic view the stationary blade ring of the present invention of an aircraft engine.

Stationary blades 2 are adjustable around their blade axis or main axis H, which extends radially to machine axis M, and each have a blade 8, an inner blade plate 10 and a bearing journal 12 which extends radially to the inside from inner blade plate 10. In addition, stationary blades 2 each have a radially outer blade plate (shown schematically as 200 in FIG. 5), as well as an adjusting journal which extends radially to the outside from the outer blade plate and with the aid of which they interact with a housing-side adjusting device for pivoting around its main axis H.

Inner blade plates 10 are each situated in a radial outer sunken section 14 of a bearing hole 16 of bearing body 6. They have a radial inner underside 18 and an upper side 20 diametrically opposed to underside 18. Underside 18 and upper side 20 run in parallel or nearly to each other in the illustrated exemplary embodiment. In particular, underside 18 runs in the direction of machine axis M. Together with an upstream or front annular chamber surface 22 of inner ring 4, a downstream or rear annular chamber surface 24 of inner ring 4 and a top surface 26 of bearing bodies 6 which are penetrated by bearing hole 16, upper side 20 forms an unsegmented or nearly unsegmented radial inner side wall section of an annular chamber through which the main flow flows.

Bearing journals 12 are radially tapered toward inner blade plates 10 in relation to main axis H and each guided in a bush section 28 of bearing hole 16. Bush sections 28 are radially tapered toward sunken sections 14 and situated radially inward in relation thereto with regard to machine axis M.

Inner ring 4 is used for the radially inner stabilization or support of stationary blades 2 and is spaced a distance from the rotor section via a radial clearance. In the illustrated exemplary embodiment, the inner ring is composed of two half rings 104, 204, shown schematically in FIG. 5, each having a circumferential angle of 180°, which are assembled to form inner ring 4 in the area of a horizontal housing parting plane of the turbomachine. They each have a U-shaped profile, including a front wall 30, a rear wall 32 and a circumferential wall 34, which connects the two walls 30, 32 to each other, viewed in a flow direction x.

Front and rear walls 30, 32 extend radially to the outside, viewed from circumferential wall 18, and each form a circumferential section of front annular chamber surface 22 and rear annular chamber surface 24. Rear annular chamber surface 24 extends over a downstream axial projection 36 of rear wall 32. A radial rim clearance 38, which is minimized to achieve a high compressor efficiency, is provided between blades 8 and axial projection 36 or rear annular chamber surface 24.

Walls 30, 32 have guiding projections 40, 42 which face axially to the inside and which are situated opposite each other for the purpose of guidance on bearing bodies 6. Guiding projections 40, 42 extend in the circumferential direction of the half rings and each has a preferably rectangular cross section.

Circumferential wall 34 is oriented in the direction of machine axis M. A seal 44 is situated on circumferential wall 34 on the circumferential side for the purpose of sealing the radial clearance between inner ring 4 and the diametrically opposed rotor section. This seal is, for example, a plate-type honeycomb seal and is used to engage with rotor-side seal tips or seal fins. Seal 44 is preferably soldered, welded or riveted to circumferential wall 34 and divided into two arc-shaped sealing elements which match the half rings and which each preferably have an arc angle of 180°. Greater segmentation of the sealing elements is, of course, also possible.

Bearing bodies 6 are used for the radial inner bearing of stationary blades 2. Each bearing body 6 is used to support a single stationary blade 2, whereby inner ring 4 is centered in a spoke-like manner. Bearing bodies 6 are preferably made of a plastic having a high thermal, chemical and mechanical stress tolerance. Alternatively, bearing bodies 6 are metal bodies, each of which is provided with an antifriction layer in its inner circumference at least in the area of its bush section 28.

Figure 2:
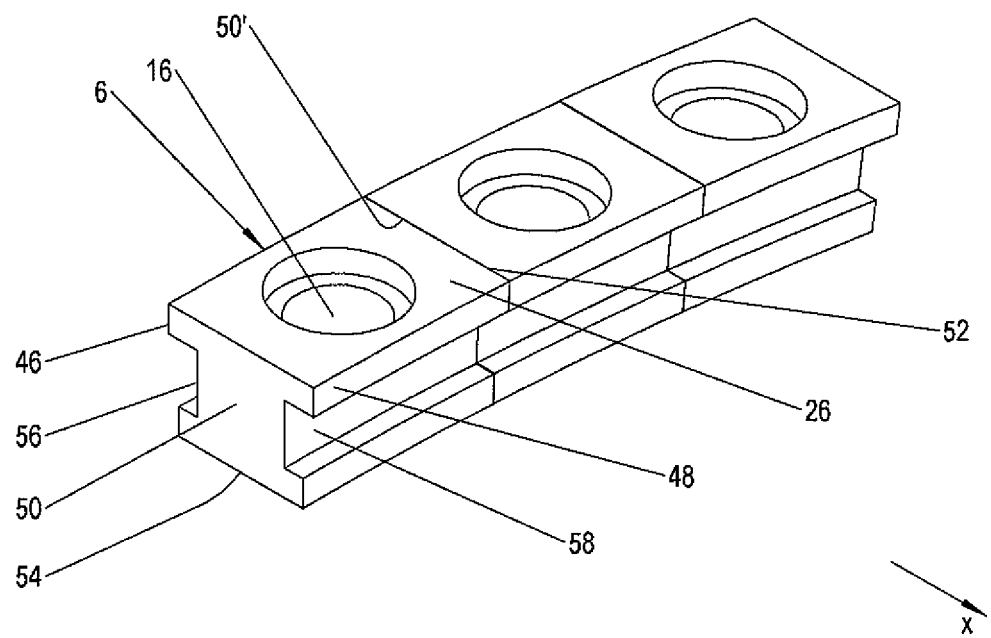
FIG. 2 shows a perspective configuration of adjoining bearing bodies from FIG. 1 in the circumferential direction.
Figure 3:
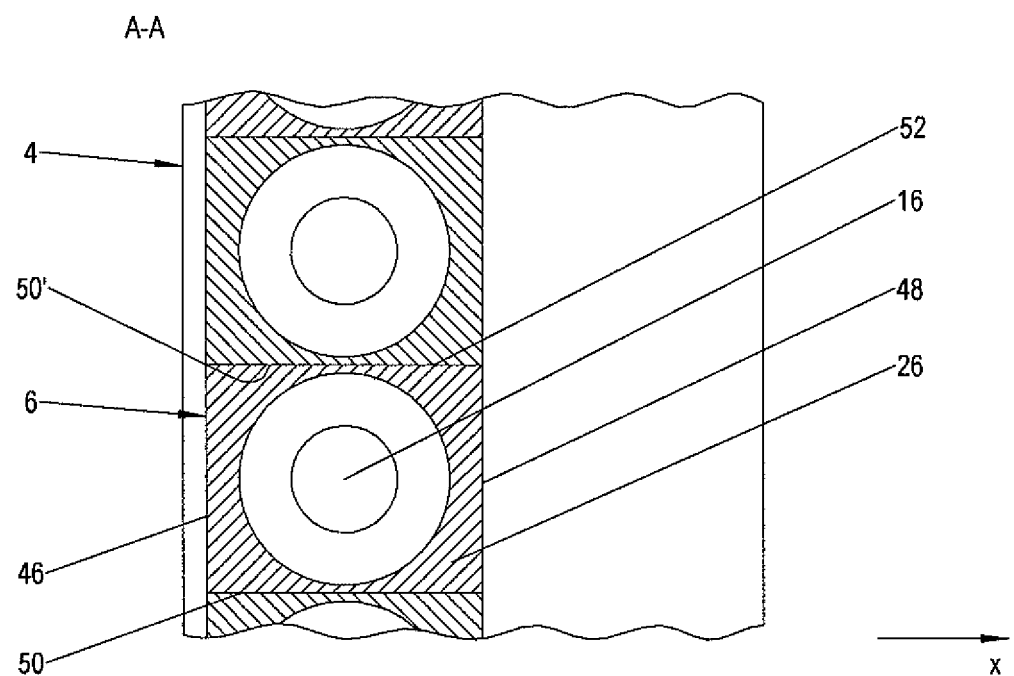
FIG. 3 shows a top view of the bearing bodies which are stabilized by an inner ring from FIG. 1.

As shown in FIGS. 2 and 3, bearing bodies 6 each have a cuboid main body which is penetrated by bearing hole 16 in the radial direction in relation to machine axis M. The main body has a front side 46, a rear side 48 and two side surfaces 50, 52, viewed in flow direction x. Furthermore, the main body has top surface 26 penetrated by bearing hole 16 and a bottom surface 54, which is diametrically opposed to the top surface and is also penetrated by bearing hole 16, as is apparent in FIG. 1. A guiding groove 56, 58, which extends in the circumferential direction, is introduced into front side 46 and into rear side 48 for the purpose of accommodating inner ring-side guiding projections 40, 42. Guiding grooves 56, 58 have a rectangular cross section which matches guiding projections 40, 42. Side surfaces 50, 52 have a flat design and are used for mutual contacting of particular adjacent bearing bodies 6 in the assembled state.

A preferred method for assembling stationary blade ring 1 is explained below. Stationary blade ring 1 is mounted on each housing half and closed to form a ring only by assembling the two housing halves. Stationary blades 2 are first inserted into corresponding housing-side bearings of the housing halves with the aid of their adjusting journals. Bearing bodies 6 are then positioned individually on bearing journals 12. Inner blade plates 10 are inserted into sunken sections 14, and bearing journals 12 are accommodated in bush sections 28. Bearing bodies 6 are now located next to each other in the circumferential direction and touch each other by their diametrically opposed side surfaces 52, 50' (cf. FIG. 2). The half rings are then pushed onto bearing bodies 6 in the circumferential direction without deformation (cf. FIG. 3). Inner ring-side guiding projections 40, 42 engage with bearing body-side guiding grooves 56, 58. Bearing bodies 6 are fixed to each other in the circumferential direction, in the axial direction and in the radial direction. Due to the fact that bearing journals 12 are radially tapered toward inner blade plates 10, undersides 18 thereof each act as an annular shoulder surface, which represents a movement-limiting element for inner ring 4 or for its half rings, thereby preventing rim clearance 38 from closing and inner ring 4 from running into blades 8 in the event of thermal expansions.

Figure 4:
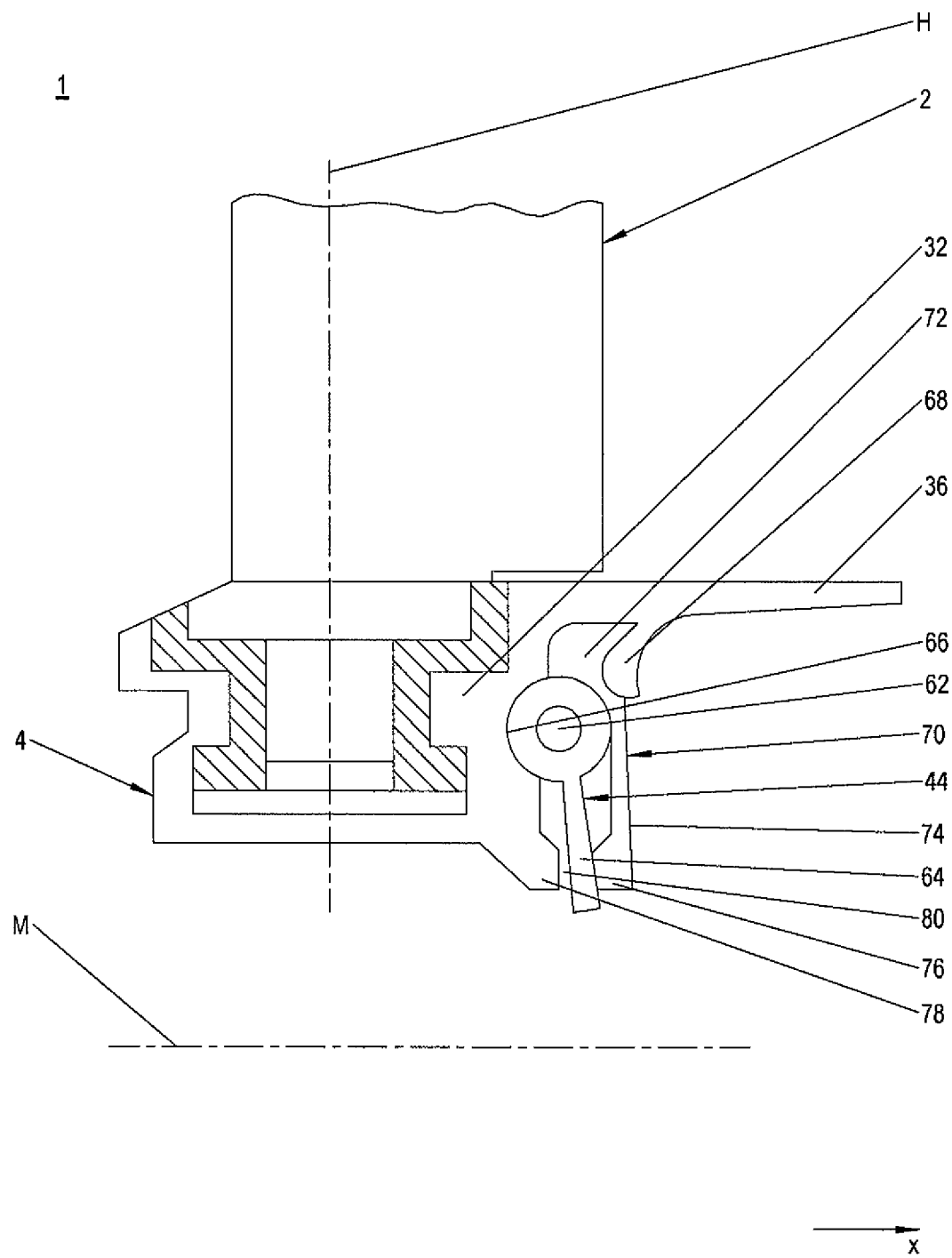
FIG. 4 shows an axial sectional view of a second exemplary embodiment of the stationary blade ring according to the present invention.

FIG. 4 shows an exemplary embodiment of stationary blade ring 1 according to the present invention, which has a brush-type or sealing lip-type seal 44 instead of a plate-type seal. Seal 44 is situated downstream from stationary blades 2 in the area of rear wall 32 of the half rings or inner ring 4. It is composed of brush elements which cover a circumferential angle of 180°, matching the half rings. The brush elements each have a retaining section 62, which has a circular cross section, and a sealing section 64, which extends in the radial direction. The brush elements project radially to the inside over circumferential wall 34 by their sealing sections 64 and rub against the front of the diametrically opposed rotor section, closing the radial clearance. Together with retaining section 62, they are each accommodated in sections in a rear retaining groove 66 of rear wall 32 and clamped between rear wall 32 and radial web 68 with the aid of a clamping body 70 supported by a radial web 68 which extends radially toward the inside from axial projection 36. At the same time, a leakage path between rear wall 32 and clamping body 70 is closed as a result of the clamping.

Clamping body 70 preferably extends by 180° in the circumferential direction. An inner ring thus preferably has one clamping body 70 for each half ring and thus a total of two clamping bodies 70. However, clamping body 70 may also have a greater segmentation. It has a clamping section 72, which interacts in a form-locked manner with retaining section 62 and radial web 68, as well as a radially inner guiding section 74, which is located at a distance from clamping section 72. Guide section 74 has an angle section 76, oriented upstream, which represents an axial rear stop for sealing section 64. An axial front stop for sealing section 64 is provided by an extension 78, diametrically opposed to angle section 76, in the transition area between circumferential wall 34 and rear wall 32. A narrow axial clearance 80 is also formed by angle section 76 and extension 78, which minimizes a leakage path in the direction of retaining section 62.

Disclosed is an adjustable stationary blade ring of a turbomachine, whose stationary blades are each supported individually in a bearing body onto which an inner ring, which is divided into two half rings and acts as a seal carrier, is pushed without deformation, viewed in the circumferential direction, as well as a method for assembling a stationary blade ring of this type and a turbomachine having a stationary blade ring of this type.

LIST OF REFERENCE NUMERALS

1 Stationary blade ring
2 Stationary blades
4 Inner ring
6 Bearing body
8 Blade
10 Inner blade plate
12 Bearing journal
14 Sunken section
16 Bearing hole
18 Underside
20 Upper side
22 Front annular chamber surface
24 Rear annular chamber surface
26 Top surface
28 Bush section
30 Front wall
32 Rear wall
34 Circumferential wall
36 Axial projection
38 Rim clearance
40 Projection
42 Projection
44 Seal
46 Front side
48 Rear side
50, 50' Side surface
52 Side surface
54 Bottom surface
56 Guiding groove
58 Guiding groove
62 Retaining section
64 Sealing section
66 Retaining groove
68 Radial web
70 Clamping body
72 Clamping section
74 Guide section
76 Angle section
78 Extension
100 Rotor section
104 Inner ring half
200 Outer blade plate
204 Inner ring half
H Main axis/blade axis
M Machine axis
x Flow direction/axial direction

What is claimed is:

1. A stationary blade ring for a turbomachine comprising:
a plurality of rotatable stationary blades;
an inner ring for radial inner stabilization of the stationary blades;
a seal for sealing a radial clearance between the inner ring and a diametrically opposed rotor section; and
bearing bodies for supporting the stationary blades in the inner ring, each stationary blade being supported via a bearing journal in a bearing hole of an individual bearing body of the bearing bodies, each bearing body having a cuboid main body in which the bearing hole is formed;
the inner ring being composed of two half rings supporting the bearing bodies, each of the half rings spanning a circumferential angle of 180 degrees, and each having a U-shaped profile including, with respect to a flow direction of a main flow, a front wall, a rear wall and a circumferential wall connecting the front and rear walls.

2. The stationary blade ring as recited in claim 1 wherein the bearing bodies touch each other on the side and have two diametrically opposed guiding grooves extending in the circumferential direction, and the half rings each include two diametrically opposed guiding projections extending in the circumferential direction and engaging with the guiding grooves.

3. The stationary blade ring as recited in claim 1 wherein the bearing bodies each have a bush section, the stationary blades being radially guided in the bush section by the bearing journal each in relation to a blade main axis, the bearing bodies each having a further section, the stationary blades in the further section being accommodated by inner blade plates radially extended in relation to the bearing journals.

4. The stationary blade ring as recited in claim 1 wherein the bearing bodies are made of plastic.

5. The stationary blade ring as recited in claim 3 wherein the bearing bodies are metallic, and at least the bush sections are provided with a non-friction layer on inner circumferential sides.

6. The stationary blade ring as recited in claim 1 wherein the seal has a plurality of plate-type sealing elements, each of which is situated on a circumferential wall of the half rings.

7. The stationary blade ring as recited in claim 1 wherein the seal has a plurality of brush elements detachably clamped to the half rings downstream from the stationary blades.

8. The stationary blade ring as recited in claim 7 wherein the brush elements are each inserted into a retaining groove of the half rings by a retaining section and fixed in place with the aid of a clamping body inserted between a radial web of the half rings and the retaining section.

9. A method for assembling a stationary blade ring comprising:
mounting a bearing body on a bearing journal of a stationary blade, and
pushing half rings onto the bearing bodies in the circumferential direction for the purpose of stabilizing the bearing bodies, the half rings after the pushing step defining the stationary blade ring as recited in claim 1.

10. A turbomachine comprising:
a compressor including
a compressor-side stationary blade ring including the stationary blade ring as recited in claim 1.

* * * * *